United States Patent
Avnery

(10) Patent No.: US 8,857,137 B2
(45) Date of Patent: Oct. 14, 2014

(54) ROBOTIC LAWN MOWER FOR CUTTING AROUND CONVEYANCE MEMBER

(76) Inventor: Tzvi Avnery, Winchester, MA (US)

(*) Notice: Subject to any disclaimer, the term of this patent is extended or adjusted under 35 U.S.C. 154(b) by 288 days.

(21) Appl. No.: 13/298,401

(22) Filed: Nov. 17, 2011

(65) Prior Publication Data

US 2013/0128043 A1      May 23, 2013

(51) Int. Cl.
| | | |
|---|---|---|
| *A01B 69/00* | (2006.01) | |
| *A01B 79/00* | (2006.01) | |
| *A01D 34/00* | (2006.01) | |
| *A01D 34/73* | (2006.01) | |
| *A01D 34/84* | (2006.01) | |
| *A01D 42/00* | (2006.01) | |
| *H04N 7/18* | (2006.01) | |

(52) U.S. Cl.
CPC ............... *A01D 34/73* (2013.01); *A01D 34/84* (2013.01); *A01D 42/00* (2013.01); *H04N 7/185* (2013.01); *A01D 34/008* (2013.01)
USPC .......................................... 56/10.2 A; 701/23

(58) Field of Classification Search
CPC . A01D 34/008; A01D 2101/00; A01D 34/73; A01D 34/84; G05D 2201/0208; G05D 1/0231; A01B 69/008; A01B 69/007
USPC ................. 56/DIG. 7, 10.2 A; 318/580, 587; 701/23, 25; 180/167, 65.22, 62.285
See application file for complete search history.

(56) References Cited

U.S. PATENT DOCUMENTS

| | | | |
|---|---|---|---|
| 2,082,764 A * | 6/1937 | Hosier .............................. | 56/10.5 |
| 2,509,936 A * | 5/1950 | Packwood ....................... | 56/16.7 |
| 2,522,112 A * | 9/1950 | Gilmour ......................... | 56/17.2 |
| 3,141,283 A * | 7/1964 | Swindler ......................... | 56/17.2 |
| 3,516,234 A * | 6/1970 | Snook .............................. | 56/16.9 |
| 3,540,198 A * | 11/1970 | Erickson et al. ................ | 56/295 |
| 3,550,714 A * | 12/1970 | Bellinger ........................ | 180/168 |
| 3,563,327 A * | 2/1971 | Mier ............................... | 180/169 |
| 3,780,504 A | 12/1973 | Haseloff | |
| 3,835,630 A | 9/1974 | von der Au | |
| 3,974,629 A | 8/1976 | Russell et al. | |
| 4,027,463 A | 6/1977 | Takahashi et al. | |
| 4,084,395 A * | 4/1978 | Nannen ........................... | 56/15.4 |
| 4,090,346 A | 5/1978 | Doi | |
| 4,199,922 A | 4/1980 | van der Lely | |
| 4,267,686 A * | 5/1981 | Heath ............................. | 56/12.7 |
| 4,322,934 A | 4/1982 | Doi | |
| 4,622,807 A | 11/1986 | Reymann | |

(Continued)

FOREIGN PATENT DOCUMENTS

EP           1745686 A1 *  1/2007 ............. A01D 34/00

OTHER PUBLICATIONS

SummitMowers, Remote Control Lawn Mowers, URL: http://www.summitmowers.com/videos.php.

*Primary Examiner* — Arpád Fábián-Kovács
(74) *Attorney, Agent, or Firm* — Hamilton, Brook, Smith & Reynolds, P.C.

(57) ABSTRACT

A vegetation cutting apparatus including a movable carriage having a conveyance system for facilitating conveyance of the carriage over ground. The conveyance system can have conveyance members for facilitating such conveyance. A cutting system can be mounted to the carriage for cutting vegetation. The cutting system can include at least one cutting member which is positionable laterally around the periphery of at least one conveyance member for enabling cutting of vegetation laterally around the at least one conveyance member.

24 Claims, 9 Drawing Sheets

(56) References Cited

U.S. PATENT DOCUMENTS

| | | | |
|---|---|---|---|
| 4,704,848 A * | 11/1987 | Nannen | 56/17.2 |
| 4,777,785 A * | 10/1988 | Rafaels | 56/10.2 A |
| 4,873,819 A * | 10/1989 | Shivers et al. | 56/17.5 |
| 5,163,273 A * | 11/1992 | Wojtkowski et al. | 56/11.9 |
| 5,323,593 A * | 6/1994 | Cline et al. | 56/10.2 A |
| 5,444,965 A * | 8/1995 | Colens | 56/10.2 A |
| 5,507,137 A * | 4/1996 | Norris | 56/10.2 J |
| 5,528,888 A * | 6/1996 | Miyamoto et al. | 56/10.2 F |
| 5,572,856 A | 11/1996 | Ku | |
| 5,974,347 A * | 10/1999 | Nelson | 701/22 |
| 6,062,013 A | 5/2000 | Wolske | |
| 6,301,863 B1 | 10/2001 | Liebrecht | |
| 6,443,509 B1 * | 9/2002 | Levin et al. | 293/4 |
| 6,604,348 B2 * | 8/2003 | Hunt | 56/10.6 |
| 6,611,738 B2 * | 8/2003 | Ruffner | 701/23 |
| 7,677,344 B2 | 3/2010 | Medina et al. | |
| 2003/0023356 A1 * | 1/2003 | Keable | 701/23 |
| 2007/0142964 A1 * | 6/2007 | Abramson | 700/245 |
| 2008/0007193 A1 * | 1/2008 | Jones et al. | 318/568.12 |
| 2008/0039974 A1 * | 2/2008 | Sandin et al. | 700/258 |
| 2008/0109126 A1 | 5/2008 | Sandin et al. | |
| 2008/0161968 A1 | 7/2008 | Adegbile | |
| 2013/0218397 A1 * | 8/2013 | Griffini et al. | 701/26 |

\* cited by examiner

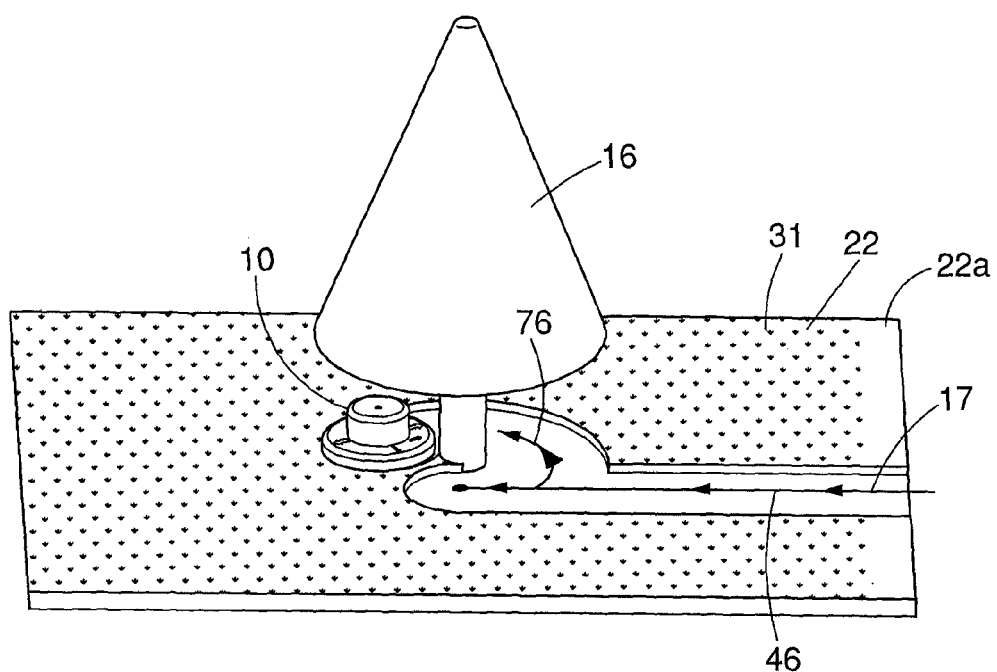
FIG. 6
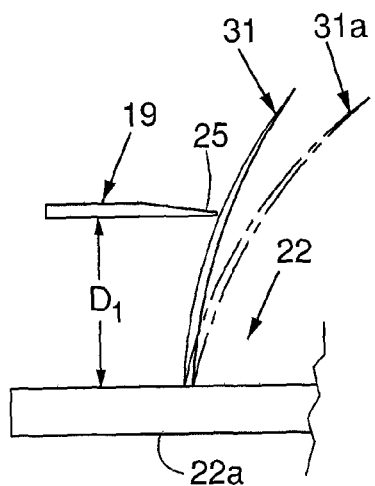
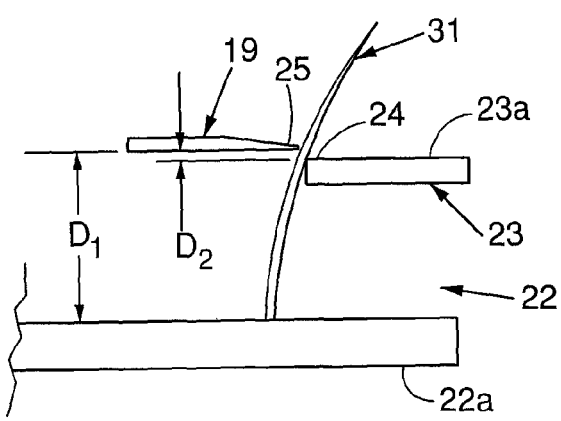
FIG. 8A  FIG. 8B

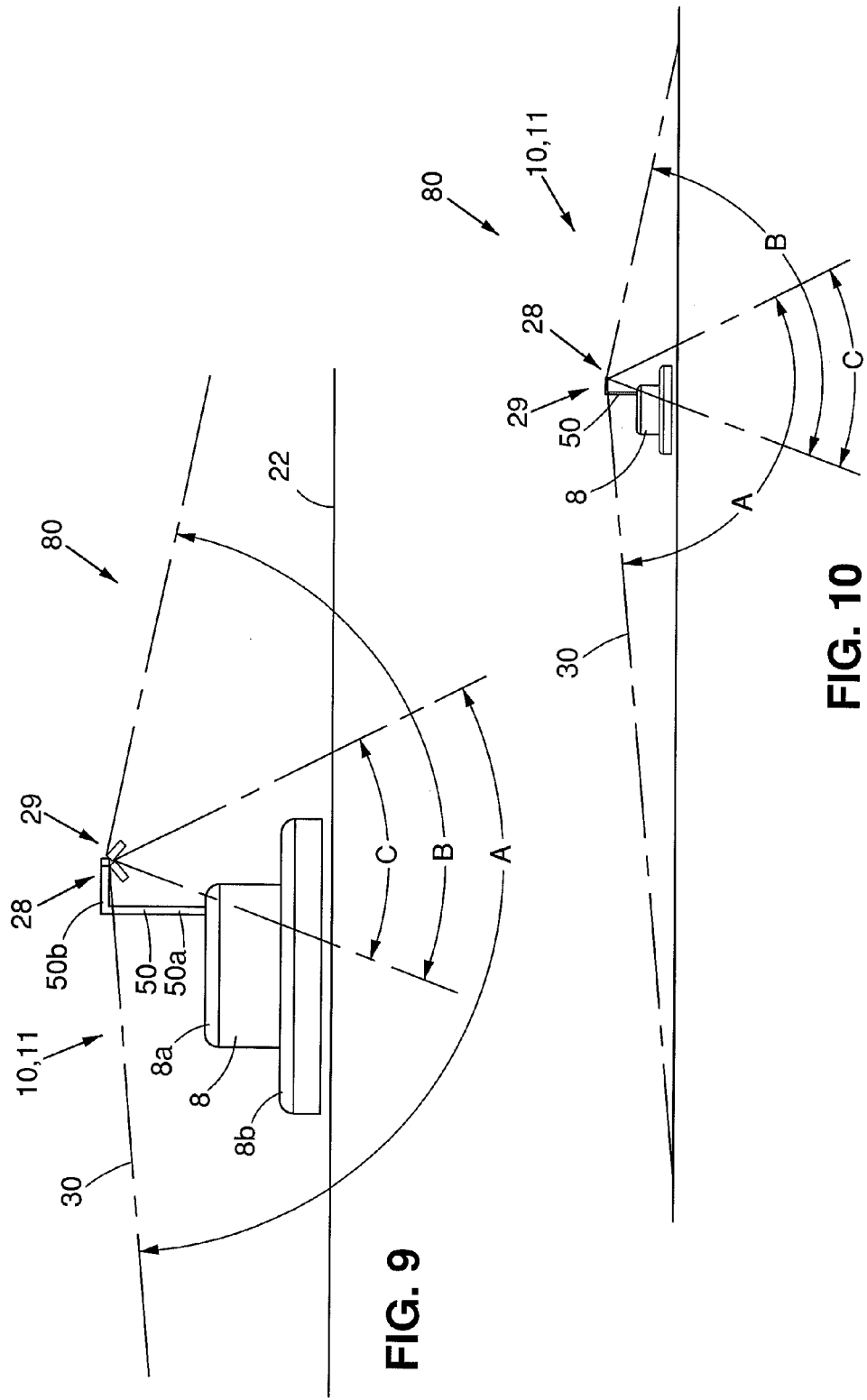

ROBOTIC LAWN MOWER FOR CUTTING AROUND CONVEYANCE MEMBER

BACKGROUND

Most lawn mowers typically have one or more rotating blades mounted to a chassis between a set of wheels. The blades are most often powered by a gas engine to provide sufficient power to the blades, since the blades are often thick and heavy and are rotated at high speed. A typical push mower can have a cutting width of about 18 inches wide, and industrial or self propelled mowers can often have a cutting width up to 42 to 52 inches. In order to cut such large widths in an industrial or self propelled mower, a large gas engine is required to provide sufficient power for the blades. In contrast, electric powered robotic mowers typically have small cutting widths, such as 12 inches, in order to keep electrical power requirements low enough so that a battery can provide power long enough to cut a lawn.

SUMMARY

The present invention provides a vegetation cutting apparatus such as a lawn mower having an energy efficient cutting design that enables a larger cutting width than prior art battery powered lawn mowers.

The present invention can provide a vegetation cutting apparatus including a movable carriage having a conveyance system for facilitating conveyance of the carriage over ground. The conveyance system can have conveyance members for facilitating such conveyance. A cutting system can be mounted to the carriage for cutting vegetation. The cutting system can include at least one cutting member which is positionable laterally around the periphery of at least one conveyance member for enabling cutting of vegetation laterally around the at least one conveyance member.

In particular embodiments, the cutting apparatus can be a lawn mower. The conveyance members can include a set of wheels. The at least one cutting member can be positionable laterally around the set of wheels for enabling cutting of vegetation laterally around the set of wheels. The set of wheels can include two side drive wheels, and front and rear free wheeling wheels. The front and rear free wheeling wheels can be swiveling caster wheels. The cutting system can include a rotary member rotatably mounted about a rotary member rotational axis which rotates at least one cutting blade laterally around the at least one conveyance member. The rotary member can have two rotary arms extending on opposite sides of the rotary member rotational axis. Each rotary arm can rotate a respective cutting blade around the at least one conveyance member. The cutting blades can be replaceable. In one embodiment, each cutting blade can be also rotated relative to its respective rotary arm about a respective cutting blade rotational axis.

In another embodiment, the cutting system can include a stationary peripheral vegetation ring member positioned around the at least one conveyance member for laterally engaging the vegetation. The rotating cutting blades can be rotated relative to and adjacent to peripheral surfaces of the stationary peripheral vegetation ring member for cutting the laterally engaged vegetation. The peripheral surfaces of the stationary peripheral vegetation ring member can include at least one portion that has a curve with an increasing radius moving in a rotary arm rotational direction for facilitating cutting action.

A protective grill can substantially surround a lateral periphery of the cutting system. The protective grill can include a series of grill members that are spaced apart from each other for blocking lateral passage of large objects to the cutting system while allowing the passage of vegetation to be cut.

First and second cameras can be mounted to the cutting apparatus and face in two different directions. Images from the first and second cameras can be combined together to form a single combined image to provide remote viewing of the cutting apparatus. The images can be combined together with pixel smoothing. The cameras can be mounted to a structure extending above the carriage and can each have views. One camera can be angled downwardly forwardly and the other camera can be angled downwardly rearwardly. The views of the cameras can be overlapped with each other. The single combined image can show front and rear ends, and sides, of the cutting apparatus as well as some adjacent environment. In some embodiments, the cutting apparatus can have more than two cameras mounted thereto, and the images from the more than two cameras can be combined together to form the single combined image.

The present invention can also provide a lawn mower including a movable carriage including a conveyance system having a set of wheels for conveying the carriage over ground. A cutting system can be mounted to the carriage for cutting grass. The cutting system can include a rotary member which rotates cutting blades laterally around the set of wheels for enabling cutting of the grass laterally around the set of wheels.

The present invention can also provide a cutting apparatus including a stationary peripheral vegetation ring member for laterally engaging vegetation. A rotary blade can rotate relative to and adjacent to peripheral surfaces of the stationary peripheral vegetation ring member for cutting the laterally engaged vegetation.

The present invention can also provide a spreading apparatus including a moveable carriage having a conveyance system for facilitating conveyance of the carriage over ground. The conveyance system can include conveyance members for facilitating such conveyance. A spreading system can be mounted to the carriage for spreading spreadable components. The spreading system can include at least one spreading member which is positionable laterally around the periphery of at least one conveyance member for enabling spreading of the spreadable components laterally around the at least one conveyance member.

The present invention can also provide a viewing system for a mobile apparatus including a first viewing camera mounted above the mobile apparatus and angled downwardly forwardly. A second viewing camera can be mounted above the mobile apparatus and angled downwardly and rearwardly. Images from the first and second cameras can be overlapped with each other and combined together to form a single combined image showing front and rear ends, and sides, of the mobile apparatus as well as some adjacent environment, to provide remote viewing of the mobile apparatus.

The present invention can also provide a method of cutting vegetation including conveying a movable carriage of a cutting apparatus over ground. The movable carriage can have a conveyance system with conveyance members for facilitating such conveyance. Vegetation can be cut with a cutting system that is mounted to the carriage. The cutting system can include at least one cutting member which is positionable laterally around the periphery of at least one conveyance member for enabling cutting of vegetation laterally around the at least one conveyance member.

In particular embodiments, the cutting apparatus can be a lawn mower. A set of wheels can be the conveyance members.

The at least one cutting member can be positioned laterally around the set of wheels for enabling cutting of vegetation laterally around the set of wheels. The set of wheels can have two drive wheels, and front and rear free wheeling wheels. Swiveling caster wheels can be the free wheeling wheels. At least one cutting blade of the cutting system can be rotated laterally around the at least one conveyance member with a rotary member. The rotary member can be rotatably mounted about a rotary member rotational axis. The rotary member can have two rotary arms extending on opposite sides of the rotary member rotational axis. Each rotary arm can rotate a respective cutting blade around the at least one conveyance member. The cutting blades can be replaceable. In one embodiment, each cutting blade can be also rotated relative to its respective rotary arm about a respective cutting blade rotational axis.

In another embodiment, vegetation can be laterally engaged with a stationary peripheral vegetation ring member positioned around the at least one conveyance member. The rotating cutting blades can be rotated relative to and adjacent to peripheral surfaces of the stationary peripheral vegetation ring member for cutting the laterally engage vegetation. The peripheral surfaces of the stationary peripheral vegetation ring member can have at least one portion that has a curve with an increasing radius moving in a rotary arm rotational direction for facilitating cutting action.

A lateral periphery of the cutting system can be substantially surrounded with a protective grill. The protective grill can include a series of grill members that are spaced apart from each other for blocking lateral passage of large objects to the cutting system while allowing the passage of vegetation to be cut.

First and second cameras can be mounted to the cutting apparatus and face in two different directions. The images from the first and second cameras can be combined together to form a single combined image to provide remote viewing of the cutting apparatus. Images can be combined together with pixel smoothing. The cameras can be mounted to a post extending above the carriage and each camera can have views. One camera can be angled downwardly forwardly and the other camera can be angled downwardly rearwardly. The views of the cameras can be overlapped with each other. The single combined image can show front and rear ends, and sides, of the cutting apparatus as well as some adjacent environment. In some embodiments, more than two cameras can be mounted to the cutting apparatus, and the images from the more than two cameras can be combined together to form the single combined image.

The present invention can also provide a method of mowing a lawn including conveying a moveable carriage of a lawn mower over ground. The moveable carriage can include a conveyance system having a set of wheels. Grass can be cut with a cutting system mounted to the carriage. The cutting system can include a rotary member which rotates cutting blades laterally around the set of wheels enabling the cutting of the grass laterally around the set of wheels.

The present invention can also provide a method of cutting vegetation including laterally engaging vegetation with a stationary peripheral vegetation ring member on a cutting apparatus. The laterally engaged vegetation can cut with a rotary blade rotating relative to and adjacent to peripheral surfaces of the stationary peripheral vegetation ring member.

The present invention can also provide a method of spreading spreadable components including conveying a movable carriage of a spreading apparatus over ground. The moveable carriage can include a conveyance system having a set of wheels. The spreadable components can be spread with a spreading system mounted to the carriage. The spreading system can include at least one spreading member which is positionable laterally around the periphery of at least one conveyance member for enabling spreading of the spreadable components laterally around the at least one conveyance member.

The present invention can also provide a method of viewing a mobile apparatus including mounting a first viewing camera above the mobile apparatus and angled downwardly forwardly. A second viewing camera can be mounted above the mobile apparatus and angled downwardly rearwardly. Images from the first and second cameras can be overlapped with each other and combined together to form a single combined image showing front and rear ends, and sides, of the mobile apparatus as well as some adjacent environment, to provide remote viewing of the mobile apparatus.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6 is a schematic perspective drawing of an embodiment of the lawn mower cutting a lawn around a tree or bush.

FIGS. 8A and 8B are schematic drawings showing vegetation or grass being cut with a cutting blade in FIG. 8A, and vegetation or grass being cut with the combination of a cutting blade and a stationary vegetation ring member in FIG. 8B.

FIGS. 9 and 10 are schematic side views of an embodiment of a vegetation cutting apparatus or lawn mower showing an embodiment of a viewing system arrangement.

DETAILED DESCRIPTION

Figure 1:
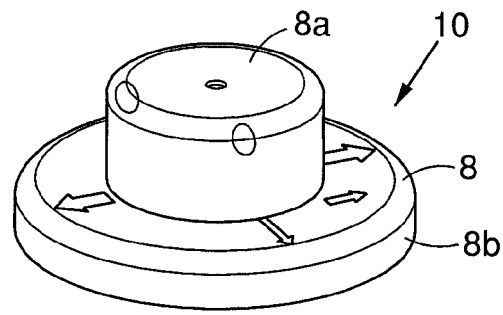
FIG. 1 is a perspective view of an embodiment of a vegetation cutting apparatus or lawn mower in the present invention.
Figure 2:
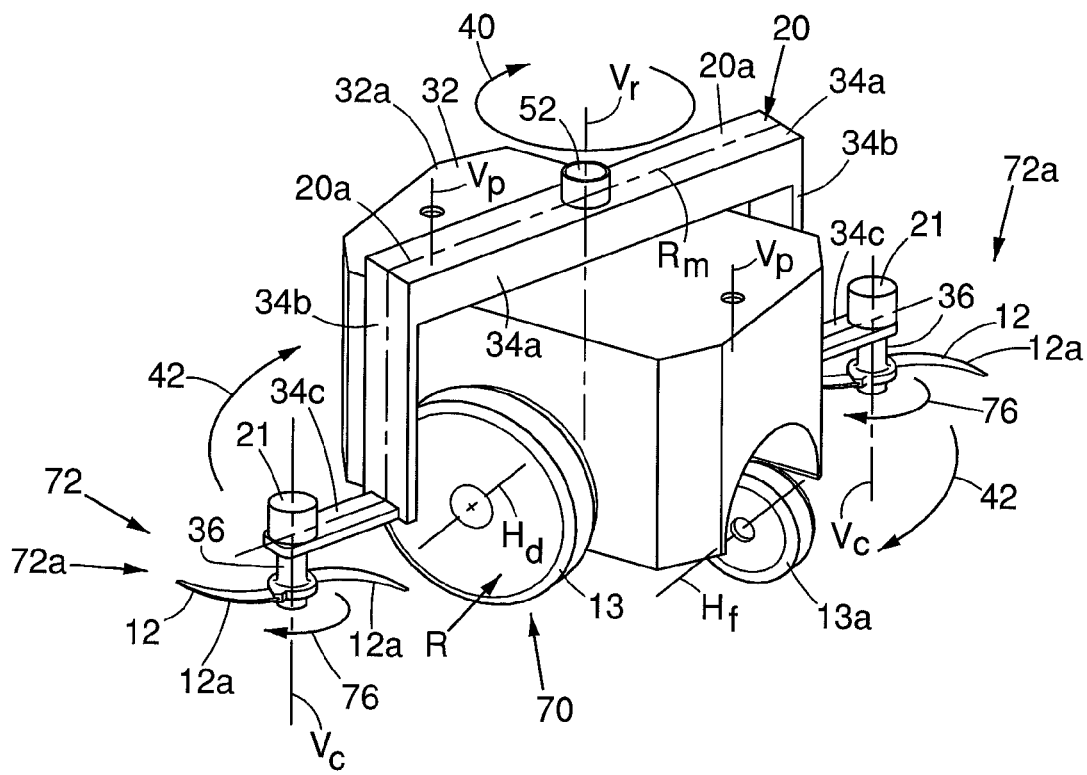
FIG. 2 is a perspective view of an embodiment of a movable carriage and cutting system of a vegetation cutting apparatus or lawn mower.
Figure 3:
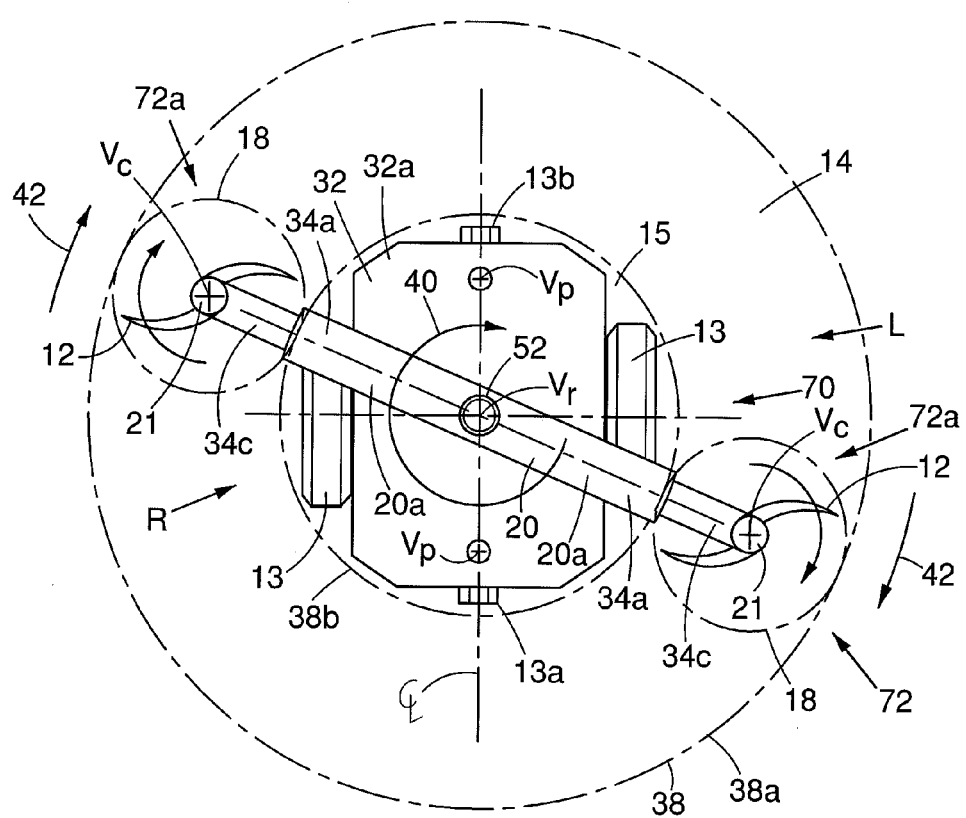
FIG. 3 is a top view of the embodiment of FIG. 2.

FIGS. 1-3, depict an embodiment of a cutting apparatus such as a vegetation cutting apparatus or lawn mower 10 in the present invention, which can cut items extending upwardly from a surface such as the ground 22a, such as vegetation or grass 31, such as in a field or lawn 22 (FIG. 6). The lawn mower 10 can have a protective safety housing, guard or cover 8, mounted over a moveable carriage 32. The moveable carriage 32 can have a conveyance or drive system, device, apparatus, mechanism or arrangement 70, for facilitating or driving the carriage over ground surfaces 22a or a lawn 22. A cutting system, device, apparatus, mechanism or arrangement 72 can be mounted to the carriage 32, which can cut radially around the periphery of the conveyance members or wheels 13 and 13a of the conveyance or drive system 70.

The housing 8 can cover or extend over the carriage 32, the drive system 70 and the cutting system 72. An upper or central housing portion 8a can extend over, around and cover the carriage 32. A lower or outer housing portion 8b can extend from and around the bottom of housing portion 8a, and can extend around and cover the outer periphery of cutting system 72. In some embodiments, the outer perimeter of housing 8 can be generally round in shape, and the upper 8a and lower 8b potions can be generally flattened cylindrical or disc shaped. The housing can be formed of a metal or light weight material, such as aluminum, plastic, fiberglass or composites, or combinations thereof, and can include one or more pieces.

Figure 4:
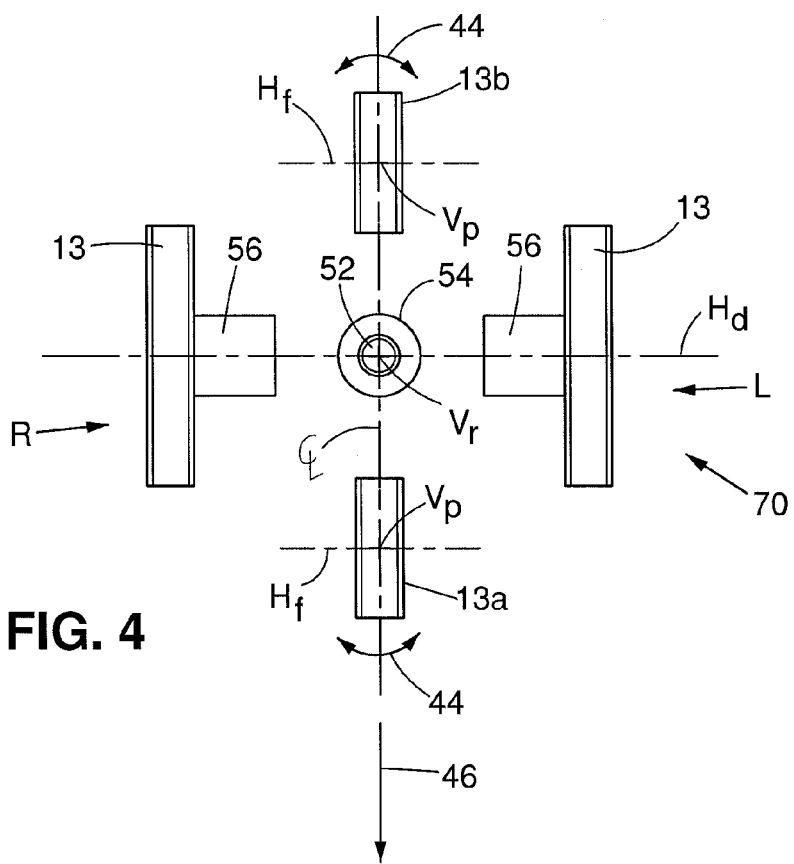
FIG. 4 is a schematic drawing of an embodiment of a conveyance system for a vegetation cutting apparatus or lawn mower moving in a straight or forward direction.

The cutting system 72 can include a rotary or rotating bridge or member 20 that is rotatably mounted to carriage 32 along or about a vertical rotary member rotational axis $V_r$ for rotating cutting members or blades 12 around the carriage 32 and drive system 70. The rotary member 20 can be coupled to a drive shaft 52 that is connected and rotatably driven by a drive motor 54 (FIG. 4). The drive shaft 52 can extend upwardly from the frame, chassis or housing 32a of carriage 32 for coupling, connecting or attaching to rotary member 20. The rotary member 20 can have two rotary arms 20a each with cutting blades 12. The rotary arms 20a can extend on opposite sides of the axis $V_r$, generally in alignment with each other, which can provide dynamic rotational balancing of rotary member 20. The rotary arms 20a can extend in alignment with each other along a lateral axis $R_m$. Each rotary arm 20a can have a first or inner horizontal portion 34a extending radially outward from axis $V_r$ along axis $R_m$, which rotates horizontally or laterally over the top of carriage 32 and housing 32a. A second intermediate vertical portion 34b can extend downwardly from the horizontal portion 34a for extending downwardly outside the housing 32a of the carriage 32 and drive system 70, towards the ground 22a. A third horizontal distal end portion 34c can extend horizontally from the vertical portion 34b radially outward along axis $R_m$. A cutting member or blade 12 can be mounted to the distal end portion 34c of each arm 20a for horizontally or laterally rotating or moving its position around the lateral periphery of the carriage 32 and drive system 70 for cutting vegetation or grass 31 horizontally or laterally around the carriage 32 and drive system 70 as the rotary member 20 rotates in the direction of arrows 42. Each cutting blade 12 can have two cutting blade segments, lengths or portions 12a which are mounted to or extend from opposite sides of a rotatable drive hub or shaft 36. Each drive shaft 36 can be rotatably connected to and driven about a respective vertical cutting blade rotational axis $V_c$ by a drive motor 21. Each drive motor 21, drive shaft 36 and cutting blade 12 can form a cutting assembly 72a. Each drive motor 21 can be mounted to the upper side or surface of a distal end portion 34c of a respective arm 20a, and the corresponding drive shaft 36 and cutting blade 12 can extend below each portion 34c.

In use, each drive motor 21 can rotate a cutting blade 12 about an axis $V_c$ in the direction of arrow 76 for cutting vegetation or grass 31 laterally adjacent or next to, or outside the carriage 32 in a generally circular cutting pattern 18 that is relatively small in size. The drive motor 54 can rotate rotary member 20 about axis $V_r$, which rotates the cutting assemblies 72a and the rotating cutting blades 12 in the direction of arrows 42 horizontally or laterally around the outside or periphery of the carriage 32 and drive system 70. This movement of position or rotation of the cutting assemblies 72a can move the circular cutting patterns 18 formed by the cutting blades 12 of the cutting assemblies 72a around the carriage 32 in a peripheral or circular motion which can form a larger peripheral generally circular or annular cutting pattern 38 having an outer periphery, boundary, circumference or diameter 38a, and an inner periphery, boundary or diameter 38b. The rotary member 20 can rotate in the direction of arrow 42 which can be in the same direction of rotation of cutting blades 12 in the direction of arrow 76, so that the cutting blades 12 can have increased apparent velocity for cutting vegetation or grass 31, that combines the velocity of rotary member 20 with the velocity of cutting blades 12. In some embodiments, the rotations can be in the opposite directions. The radius of the outer 38a, and inner 38b boundaries can differ by the length of the cutting blade 12, or in other words the annular width of the annular cutting pattern 38 can be equal to the length of the cutting blade 12, when both cutting blades 12 are the same length and positioned the same distance away from axis $V_r$. The inner boundary 38b can extend closely around the carriage 32 and wheels 13 and 13a of the drive system 70. Although two rotary arms 20a for rotating two cutting assemblies 72a are often employed, in other embodiments, only one rotary arm 20a, can rotate one cutting assembly 72a and one blade 12, or more than two rotary arms 20a can rotate more than two cutting assemblies 72a and blades 12, such as, three or four.

The cutting blades 12 can be short and small in size and weight, so that small drive motors 21 can be used in cutting assemblies 72a to rotate the blades 12. The cutting edges of cutting portions 12a of the cutting blades 12 can be angled or curved in or into the direction of rotation of arrows 76, which can facilitate the cutting action. In other embodiments, blade portions 12a and blades 12 can be angled or straight. The cutting blades 12 can be sharp razor type blades that are thin and light, weighing only a few ounces, and can be, for example, 1% of the weight of standard mower blades which are long, thick and heavy. As a result, the cutting blades 12 can be replaceable and disposable. Such a lightweight sharp blade can be rotated at a slower speed than standard lawn mower blades, thereby requiring less energy. Despite using relatively small or short cutting blades 12, one or more cutting assemblies 72a and cutting blades 12 can be rotated by a rotating member 20 around the carriage 32 and drive system 70, such that large cutting widths or diameters can be obtained. The drive motors 21 and 54 can each be relatively small motors so that large cutting widths can be obtained while at the same time minimizing energy consumption. A small energy requirement for blades 12 which can cut a large cutting width, allows the drive motors 21 and 54 of the lawn mower 10 to be electric and run from a rechargeable battery.

For example, in one embodiment, the cutting blades 12 can be 8 inches long with a 4 inch radius, which can provide a cutting pattern 18 with an 8 inch diameter. The 8 inch long cutting blades 12 can be formed from two 3 inch long blades that form the cutting portions 12a, which are mounted to a drive shaft 36 that has a 2 inch diameter. The cutting blades 12 can be rotated about axes $V_c$ that are located at positions on arms 20a about 17 inches radially outward from axis $V_r$, thereby forming a cutting radius of about 21 inches, and a total cutting width or diameter of 42 inches. This can result in a cutting pattern 38 having an outer diameter 38a of 42 inches and an inner diameter 38b of 26 inches. However with forward motion, with regard to actual cutting, the size of the inner diameter 38b is not relevant to the total cutting width. The rotary member 20 can be rotated at a speed of about 30 rpm (slow), and the cutting blades 12 can be rotated about 30 to 35 times faster, such as about 1000 rpm. The drive system 70 can have a 18 inch wheel base between wheels 13. It is understood that the wheel base of the drive system 70 and the length of the cutting blades 12 can be varied, and that the length of rotary arm can be varied or adjusted to provide various desired sizes of cutting patterns 18 and 38. The rotary member 20 can rotate one revolution per one inch travel of the lawn mower 10, allowing two cutting passes of the cutting assemblies 72a. This can allow grass 31 to be cut and recut multiple times, such as over 10 times, sometimes 16 times, per pass by the lawn mower 10. Furthermore, the cutting assemblies 72a and axes $V_c$ can be set, oriented or positioned at an angle, where the axes $V_c$ can be tilted relative to vertical, such that the tips of the cutting blades 12 pass closer to the ground 22a further away from axis $V_r$ and higher above the ground 22a closer to axis $V_r$, whereby the vegetation or grass 31 can be cut multiple times as the lawn mower 10 advances. The direction of tilt of axes $V_c$ can be varied as chosen. If desired, the cutting assemblies 72a can have blades 12 set at two different heights to aid in mulching. In other embodiments, the blades 12 can be at the same height.

Figure 5:
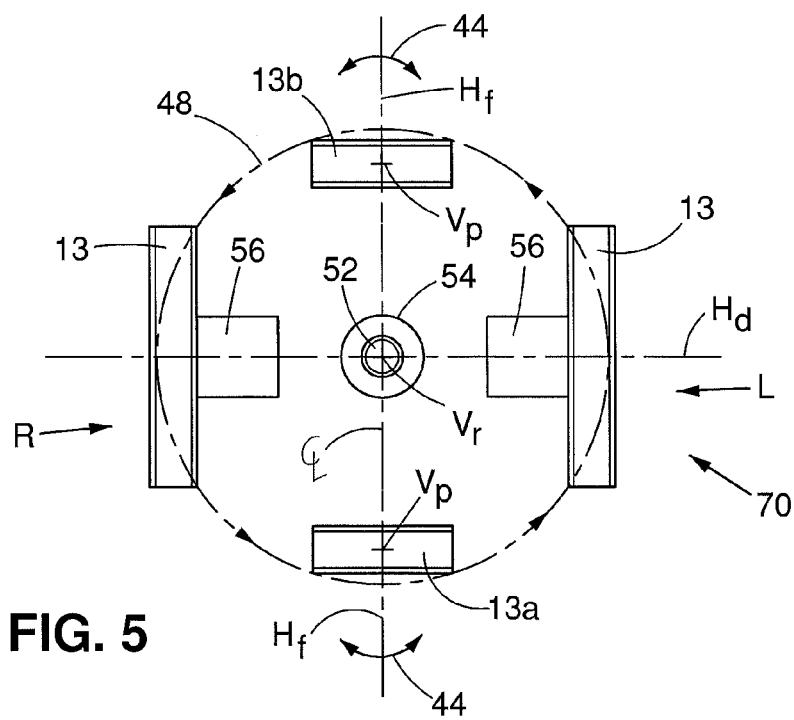
FIG. 5 is a schematic drawing of the embodiment of FIG. 4 moving in a tight circle or turn, or zero turning radius.

Referring to FIGS. 4 and 5, the drive system 70 can include two side drive wheels 13 rotatably coupled to housing 32a on the right side R and the left side L. The drive wheels 13 can be rotatably coupled to and driven by a respective drive motor 56 about a horizontal drive wheel axis $H_d$. Front 13a and rear 13b free wheeling idler or caster wheels can be rotatably, pivotably or swivelably mounted to housing 32a at the front and rear of housing 32a between wheels 13, each about a respective vertical pivoting axis $V_p$. Each pivoting axis $V_p$ allow wheels 13a and 13b to pivot about or around their axes $V_p$ in the direction of arrows 44. The two pivoting axes $V_p$ of wheels 13a and 13b can be aligned with each other on the center line axis $C_L$ of carriage 32 and housing 32a, and each wheel 13a and 13b can free wheel or idle about a respective horizontal axis $H_f$. Consequently, in use, to move the lawn mower 10 in a straight line or path in the direction of arrow 46, the drive wheels 13 can be driven by drive motors 56 equally or at equal speeds, which aligns the wheels 13a and 13b in a straight manner along center line axis $C_L$ for travel in a straight line along arrow 46. To turn, the drive wheels 13 can be driven at different speeds. For example, to turn left, the right side R drive wheel 13 can be driven faster than the left side L drive wheel 13, and to turn right, the left side L drive wheel 13 can be driven faster than the right side R drive wheel 13. The wheels 13a and 13b can each pivot about respective axes $V_p$ during turning. Drive system 70 can also turn or rotate carriage 32 in place in the direction of arrow 48, when the drive wheels 13 are rotated in opposite directions, and wheels 13a and 13b pivoted generally in the direction of arrow 48. As can be seen, drive system 70 can allow for tight turns including zero turning radius turns, to be made in any direction, even in place, and can provide high maneuverability around objects.

Referring to FIG. 6, lawn mower 10 can cut a path or pass 17 through a lawn 22, and can travel or be driven in a straight line or path 46 for cutting open portions of the lawn 22 in a straight line, and can travel or be driven in a curved path 76 to cut around objects, articles or obstructions 16 in the lawn 22, such as a tree, shrub or bush. By having a round shape that can turn in any direction, and by having the cutting blades 12 rotating around the carriage 32 and the drive system 70, the lawn mower 10 can maneuver and cut closely around objects 16 in the lawn 22, despite also being able to have a wide cutting width such as 42 inches. The lawn mower 10 can be manually pushed or controlled, remotely controlled, or robotically controlled, and movement can be preprogrammed, or can be controlled in real time by sensors, including vision systems, for example 80 (FIGS. 9 and 10).

Figure 7:
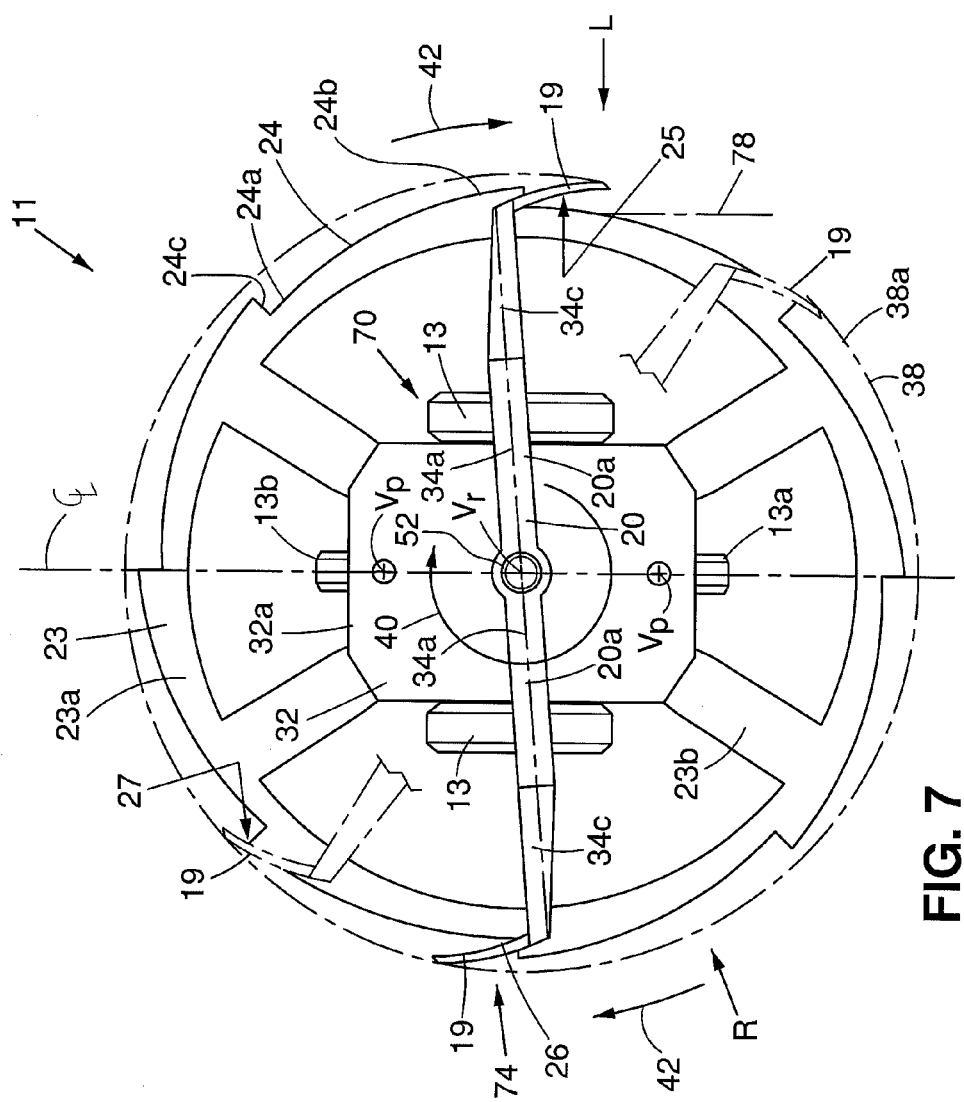
FIG. 7 is a top view of another embodiment of a movable carriage and cutting system of a vegetation cutting apparatus or lawn mower in the present invention.
Figure 11:
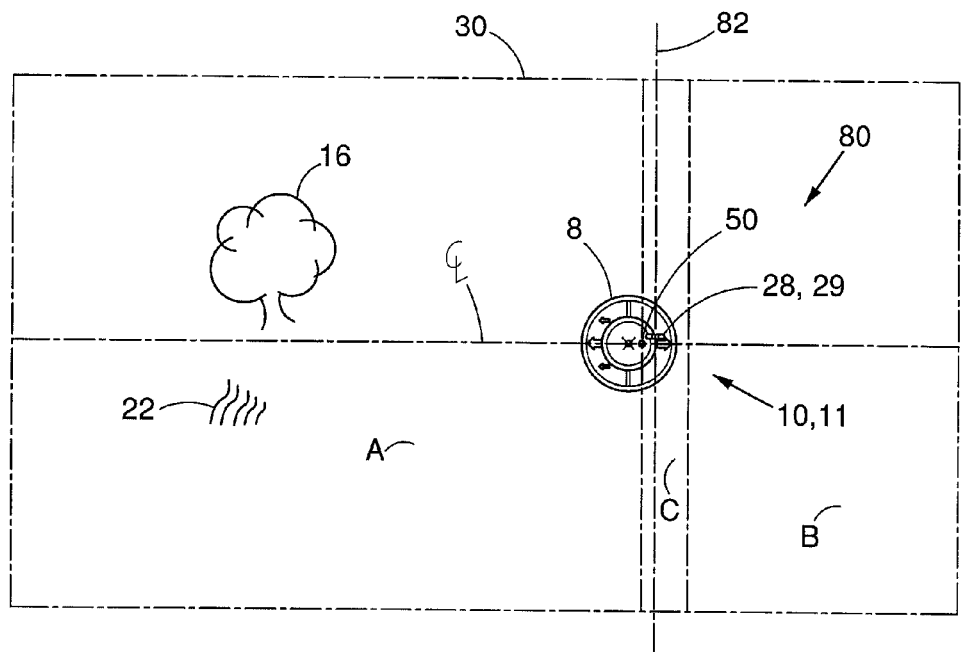
FIG. 11 is a plan schematic view of the viewing system arrangement of FIGS. 9 and 10.

Referring to FIG. 7, lawn mower 11 is another embodiment of a lawn mower in the present invention which differs from lawn mower 10 in that it has a cutting system, device, apparatus, mechanism or arrangement 74 mounted to and laterally about or around carriage 32. Cutting system 74 can have cutting blades 19, for example two, that are fixed in place, such as rigidly, to opposite ends of the rotary member 20, each to a rotary arm 20a. A cutting blade 19 can be fixed to the distal end portion 34c of each arm 20a at height $D_1$ (FIGS. 8A and 8b) pointing in the direction of rotation 42 of the rotary member 20. This moves the cutting edge 25 of each cutting blade 19 in the direction of rotation 42. The cutting edge 25 can face radially inwardly and can be angled slightly outwardly from the tangent line 78 of the rotation of rotary member 20 to promote cutting of vegetation or grass 31, with minimal resistance. The cutting blades 19 can be light weight sharp razor type blades that are replaceable and disposable. The cutting system 74 can also include a generally round stationary peripheral vegetation or grass engaging ring member 23 that is mounted to the housing 32a of carriage 32 with securement members or spokes 23b that extend radially outwardly. The ring member 23 can horizontally or laterally encircle the carriage 32, and can be located or positioned adjacent to the moving cutting blades 19, for example, underneath. The ring member 23 can laterally engage vegetation or grass 31 surrounding carriage 32 and drive system 70, for example, as the carriage 32 moves. The ring member 23 can have one or more, or a series of, outwardly facing lateral vegetation or grass engaging portions 23a that each have an outwardly facing peripheral surface or edge 24 that can have a curve with an increasing radius starting at a radially inward portion 24a and moving radially outwardly in the rotational direction 42 of motion of the rotary member 20 to a radially outward portion 24b for facilitating cutting action. Each grass engaging portion 23a can be separated from each other by a step 24c and extend in series around the perimeter of ring member 23. As a blade 19 is rotated by rotary member 20, the blade 19 forms a narrow generally, vee shaped notch, space or opening 26 with edge 24 at the radially inward portion 24a that is closed at one end or the bottom, and widens facing in the direction of rotation 42. Vegetation or grass 31 can be trapped or engaged within the vee shaped notch 26 between the blade 19 and edge 24, and as the blade 19 rotates relative to the edge 24, the size of the vee shaped notch 26 can become smaller until disappearing or becoming closed 27 at the radially outward portion 24b. This can form a cutting pattern 38 that generally extends around the periphery of ring member 23 and grass engaging portions 23a, as the vegetation or grass 31 is cut between the blades 19 and the edges 24 with rotation of the blades 19 and the notch 26. When the blades 19 are rotated in close proximity or in contact with the surface of ring member 23 or edges 24, this can create a scissor, shearing or wiping action for cutting vegetation or grass 31, where the cutting edge 25 of the blade 19 engages and cuts the vegetation or grass 31 laterally engaged or trapped between edges 25 and 24 until the vee shaped notch 26 becomes closed 27, or blades 24 and 25 overlap. The edge 24 can be sharpened to facilitate cutting action, and the cutting edge 25 of blade 19 can have a slight concave curve. In some embodiments the blades 19 and 24 can be shaped and/or positioned to provide a notch 26 that remains constant in size. Additionally, in some embodiments, the ring member 23 can be formed from a portion of the housing 32a, for example, an edge or flange of the housing 32a, and if desired, separate or individual edges 24 can be mounted thereto. The blades 19 are shown rotating above edges 24, but in some embodiments, can be rotated below edges 24. Also in some embodiments, the edges 24 can be inwardly facing, and the cutting edge 25 of blades 19 can be configured and positioned appropriately facing outwardly, to engage inwardly facing edges 24.

Referring to FIG. 8A, in some embodiments, the ring member 23 can be omitted, and when cutting the grass 31 at a height of $D_1$, the vegetation or grass 31 can be laterally bent or deflected to position 31a before the cut is made. However, the vegetation or grass 31 cutting ability can be improved with ring member 23. Referring to FIG. 8B, the edge 24 of a grass engaging portion 23a of ring member 23 can laterally support the vegetation or grass or blades of grass 31 against lateral bending moments caused by a laterally striking cutting blade 19 to allow lateral cutting without significant lateral deflection to position 31a. In some embodiments, a gap $D_2$ having a width of about the thickness of a piece of vegetation or blade of grass 31 or more, can separate blade 19 from edge 24 and still facilitate cutting without significant lateral deflection since the vegetation or grass 31 is laterally supported by edge 24 against lateral bending moments with a lateral resistive counterforce. A gap $D_2$ between blades 19 and edges 24 can reduce friction and the energy required for rotating blades 19. The use of the ring member 23 (FIG. 8B) can allow a lower rotational speed for rotating blades 19 with rotary member 20 than if the ring member 23 were omitted (FIG. 8A).

In some embodiments, the lawn mowers 10 and 11 do not have to be round, and the cutting systems 72 and 74 do not have to cut around the whole carriage 32 or drive system 70, but can be positionable, rotate or cut around the periphery of at least one or more conveyance members or wheels 13 or 13a, and still can provide increased cutting width and/or maneuverability. Drive systems with other suitable wheel configurations can be employed, and in some embodiments, the drive wheels 13 and 13a can be replaced with other conveyance members, such as tractor treads, or legs for walking over terrain. Although the rotary member 20 has been shown with straight horizontal and vertical portions, rotary member 20 can have other suitable configurations for positioning and rotating cutting blades 12 and 19, and can be curved. Rotary member 20 can have one or more than two rotary arms 20a for rotating at least one or more than two cutting members or blades 12 and 19. Blades 12 and 19 are typically rotated by rotary member 20 in a circular cutting path, but if desired in some embodiments, the cutting path can be made noncircular, by using appropriate mechanisms. Non circular paths can include linear or elliptical paths, or paths including one or more linear and/or curved paths.

Referring to FIGS. 9-12, to facilitate remote viewing or operation of lawn mower 10 or 11, a vision system or arrangement 80 can be included. The vision system 80 can have two or more cameras 28 and 29 mounted over the foot print of the lawn mower 10 or 11, such as to a structure or pole 50, that in turn is mounted to the lawn mower 10 or 11, such as to the carriage 32 or the housing 8. The pole 50 can have a vertical portion 50a and a rearwardly extending portion 50b, to which a forwardly directed 28 and a rearwardly directed 29 camera can be mounted above the rear end of the lawn mower 10 or 11. The forwardly directed camera 28 can be angled downwardly forwardly for viewing an area or field of view A for generating an image of the field of view A of the lawn mower 10 or 11 from above the rear end of the lawn mower 10 or 11, looking downwardly forwardly, showing regions to the sides and in front of the lawn mower 10 or 11. The rearwardly directed camera 29 can be angled downwardly rearwardly for viewing an area or field of view B, for generating an image of the field of view B of the lawn mower 10 or 11 from above the rear end of the lawn mower 10 or 11, of the rear end of the lawn mower 10 or 11, looking downwardly rearwardly, showing regions to the sides and behind the lawn mower 10 or 11. There can be an overlapping view region C, where the two fields of views A and B overlap each other. Region C can be made large as seen in FIG. 9, or can be very narrow, such as an inch. Together, the field of views A and B can provide a large multiple view coverage 30 of the lawn mower 10 or 11, and the surrounding environment.

The two images from the two fields of view A and B can be sent to a computer or a controller 82, which can be by wireless communication. The images from the multiple views A and B, can be combined together into a single viewable image 30A (FIG. 12) on a screen 59, which can be connected to or can be part of the computer or a controller 82. The computer or controller 82 can include controls for controlling the operation of lawn mower 10 or 11, which can be performed remotely. The combined image 30A can be formed by joining an image A1 that is at least a portion of the image generated from the field of view A by camera 28, with an image B1 that is at least a portion of the image generated from the field of view B by camera 29. The two images A1 and B1 can be joined together along a dividing, separation or combination line 58 that divides, separates, or combines the two images A1 and B1 together into a single viewable combined image 30A. The image A1 can be formed by truncating the image of view A at or along a line or axis 82 (FIG. 11) that can be within overlapping region C, and image B1 can be formed by truncating the image of view B at or along the same line or axis 82. This allows the two images A1 and B1 when joined together along combination line 58, to provide a single combined image 30A on screen 59 that shows or gives the general appearance of viewing the lawn mower 10 or 11 from a distance behind, looking forward, as if one was walking behind the lawn mower 10 or 11. Not only does the lawn mower 10 or 11 appear to be seen from behind, but the lawn 22 behind, on both sides and in front of the lawn mower 10 or 11 can be seen in the image 30A, as well as any objects 16 in the lawn 22 such as a tree, shrub or bush. This allows the user to remotely view the lawn mower 10 or 11 on screen 59, to remotely control and/or view the operation of lawn mower 10 or 11 in a manner that simulates the view of a person pushing or walking behind a lawn mower. This can enable effective and efficient mowing of a lawn 22, including maneuvering around and cutting close to objects 16 on the lawn 22. This illusion or appearance of walking behind the lawn mower 10 or 11 can be achieved by two cameras 28 and 29 mounted above the lawn mower 10 or 11, which can provide a view that can be generally equivalent to positioning a forwardly viewing camera 8 feet behind the lawn mower, for example with an 8 foot pole or boom extended behind the lawn mower.

In some embodiments, the joined images A1 and B1 may appear slightly offset in size along line 58. In addition, image B1 portion of image 30A can appear upside down or backwards, which is technically inaccurate or unorthodox, but the front view image A1 portion is the most important image portion and is an accurate view. However, image B1 portion can be still of use for reference. Image 30A is a low cost way of giving the illusion of walking behind the lawn mower 10 or 11. However, if desired, the image 30A can be processed to flip or mirror image reverse the image B1 to more accurately correspond to the view of image A1.

In some embodiments, the combined image 30A can be formed from images A1 and B1 that are full images of the views A and B, and the overlapped region C can be smoothed out with pixel smoothing and averaging. Since overlapped region C is where images A1 and B1 overlap, there would be no clear dividing line 58 between the images A1 and B1. The overlapped region C can be somewhat distorted, but can be sufficient for its intended purpose.

In some embodiments, the two cameras can be directed to the sides of lawn mower 10 or 11, similar to an animal having eyes on the sides of its head with images combined appropriately. Additionally, in some embodiments, more than two cameras can provide images which are combined into a single combined image 30A. For example, multiple cameras can be directed toward the front, back, and sides. Cameras used can have normal viewing angles, wide angle viewing, or a combination thereof. The cameras can be any suitable cameras, as know in the art, and can be digital.

Figure 13:
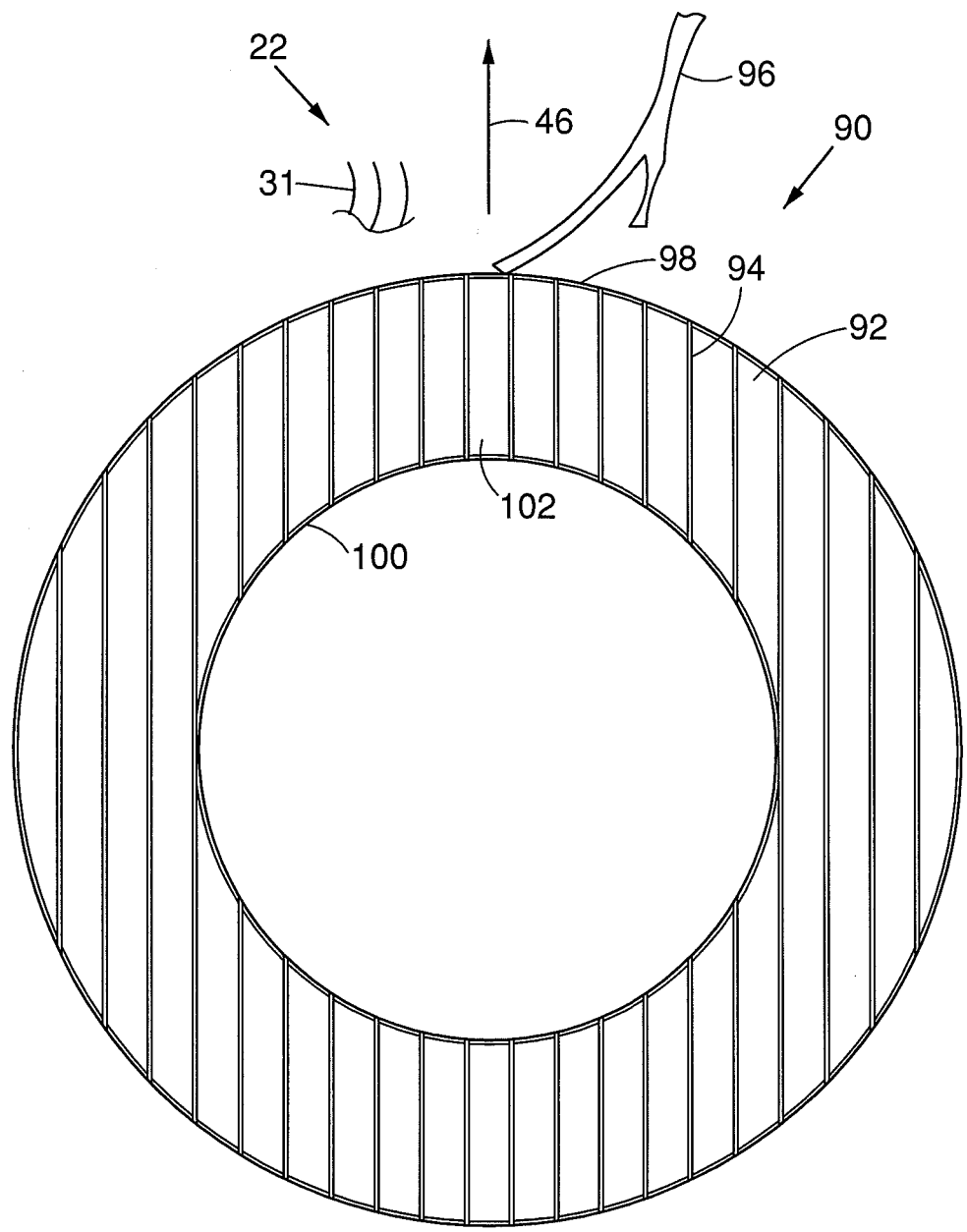
FIG. 13 is a schematic drawing of an embodiment of a protective grill or guard for the cutting blades and cutting system.

Referring to FIG. 13, in some embodiments, the lawn mower 10 or 11 can include a protective grill or guard 90, which can be mounted to or can be part of the carriage 32 and/or housing 8 for at least substantially laterally surrounding and protecting the cutting system 72 or 74 and blades 12 or 19 from damage by large objects on the lawn 22 or ground 22a, such as branches 96. In one embodiment, the grill 90 can be a ring or generally annular in shape 92, having an outer periphery or diameter 98 and an inner periphery or diameter 100. A series of grill members, bars or ribs 94 can be arranged spaced apart from each other in downwardly and laterally or horizontally extending parallel fashion on the annular shape 92 to provide straight parallel lateral or horizontal gaps 102 for not restricting and allowing the lateral or horizontal passage of vegetation or grass 31 through the gaps 102 into the path of the cutting system 72 or 74 and cutting pattern 38 for cutting, while at the same time, blocking lateral or horizontal passage of large objects such as branches 96 or body parts, such as a hand or foot. The bars 94 can be oriented to face in the direction of travel 46 of the lawn mower 10 or 11. In some embodiments, the grill 90 can be sized and positioned such that the inner periphery 100 extends around the outer periphery or boundary 38a of the cutting pattern 38 of the cutting system 72 or 74. In other embodiments, the grill 90 can be sized and positioned to overlap with or coincide with the cutting pattern 38. The bars 94 in some embodiments can be about ¾ of an inch high and about ⅛ of an inch thick. The length of the bars 94 depends upon the location relative to the annular shape 92 as seen. The bars 94 can be formed integrally with the housing 8, or can be mounted to a bracket or ring that is in turn mounted to the housing 8 or carriage 32. In other embodiments, the shape of the grill 90 does not have to be round or annular, and can include for example, a pointed front or bow, such as in a boat, which can redirect branches 96 to the side. In addition, the pointed bow can also have an upward angling surface for lifting branches 96 off the lawn 22 and then redirecting to the side. Also, in some embodiments, the bars 94 can be a ring of evenly spaced downwardly extending vertically oriented rods or pegs.

Figure 14:
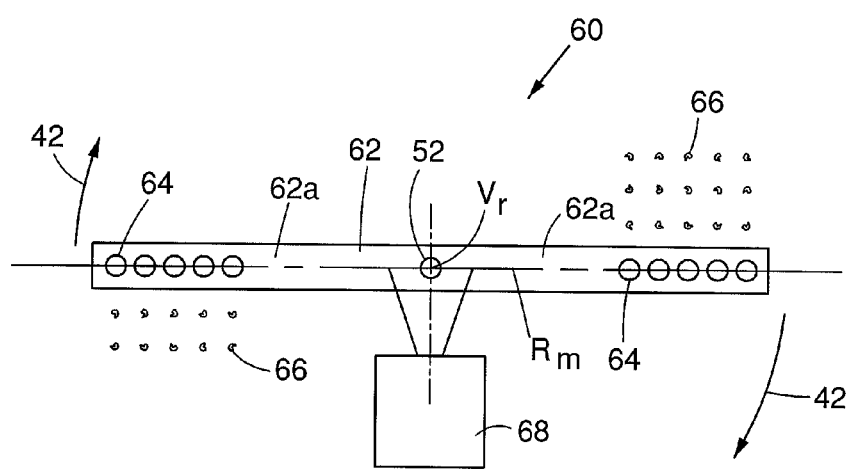
FIG. 14 is a schematic top view of an embodiment of a rotary spreading member on a spreading apparatus in the present invention.
Figure 12:
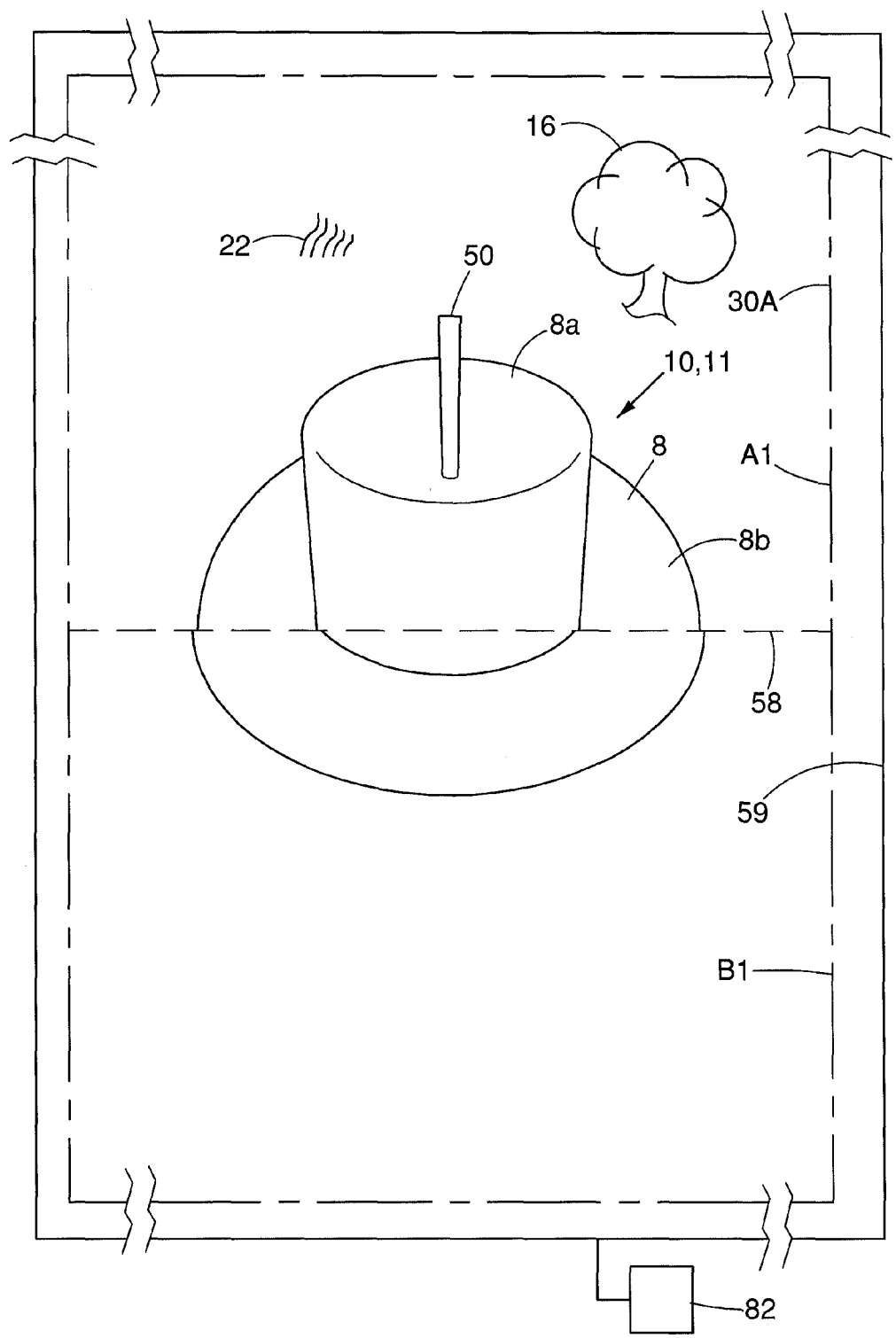
FIG. 12 is a schematic drawing of an image provided by an embodiment of the viewing system.

Referring to FIG. 14, in some embodiments, the apparatus in the present invention can be a spreader for spreading spreadable products or items or components 66, including agricultural products such as seeds, fertilizer, chemicals, minerals, organic matter, etc. In such embodiments, the cutting system 72 and the rotary member 20 can be replaced with a spreading system 60 mounted to carriage 32 having a rotary spreading member 62. The rotary spreading member 62 can be rotatably mounted to drive motor 54 by shaft 52 about axis $V_r$, and can receive spreadable components 66 in granular, powder or liquid form, which can be spread in a desired pattern through holes 64 in the rotary member 62 with rotation of rotary member 62 about axis $V_r$, in the direction of arrows 42. The holes 64 can be appropriately sized and positioned for spreading granular or liquid spreadable components 66 laterally around the carriage 32 and drive system 70. A reservoir or hopper 68 can supply the rotary arm 62 with the spreadable components 66. At least one spreading arm 62a of spreading member 62 can be positionable, movable or rotatable laterally around the periphery of at least one, more than one or all of the conveyance members 13 and 13a. The spreading member 62 can be aligned along axis $R_m$ and can be laterally straight, or can have portions which extend downwardly closer to the ground 22.

While this invention has been particularly shown and described with references to example embodiments thereof, it will be understood by those skilled in the art that various changes in form and details may be made therein without departing from the scope of the invention encompassed by the appended claims.

For example, it is understood that features of the embodiments described can be combined or omitted. In addition, various sizes and shapes can be varied as desired. The blades 12 and 19 have been shown and described as being generally elongate blades, but can have other suitable shapes. Blades 12 and 19 can have teeth and can include round saw blades. If desired, a flexible cutting wire or cord, such as in a weed trimmer, can be employed. Vegetation other than grass 31 in a lawn 22 can be cut, for example, agricultural crops in fields, or clearing land. Some embodiments can be made in large size for rotating heavy blades and can be driven by more powerful motors, which can include, electric, gas and hydraulic motors.

What is claimed is:

1. A vegetation cutting apparatus comprising:
    a movable carriage having a conveyance system configured to convey the carriage over ground, the conveyance system including conveyance members; and
    a cutting system mounted to the carriage for cutting vegetation, the cutting system including cutting blades which are laterally drivable around the periphery of all of the conveyance members for cutting of vegetation laterally around the conveyance members, the cutting system comprising a rotary member rotatably mounted about a rotary member rotational axis which rotates the cutting blades laterally around the conveyance members, the rotary member having two rotary arms extending away from the rotary member rotational axis, each rotary arm for rotating about the rotary member rotational axis for rotating a respective cutting blade around all of the conveyance members, each cutting blade also being drivably rotatable by a motor relative to its respective rotary arm about a respective cutting blade rotational axis.

2. The cutting apparatus of claim 1 in which the cutting apparatus is a lawn mower.

3. The cutting apparatus of claim 1 in which the conveyance members comprise a set of wheels.

4. The cutting apparatus of claim 3 in which the cutting blades are drivable laterally around the set of wheels for enabling cutting of vegetation laterally around the set of wheels.

5. The cutting apparatus of claim 4 in which the set of wheels comprise two side drive wheels, and front and rear free wheeling wheels.

6. The cutting apparatus of claim 5 in which the front and rear free wheeling wheels comprise swiveling caster wheels.

7. The cutting apparatus of claim 1 in which the cutting blades are replaceable.

8. The cutting apparatus of claim 3 in which the set of wheels includes drive wheels for driving the cutting apparatus, the cutting apparatus further comprising first and second cameras mounted thereto that face in two different directions, images from the first and second cameras being combined together to form a single combined image to provide remote viewing of the cutting apparatus.

9. The cutting apparatus of claim 8 in which the images are combined together in an overlapping manner.

10. The cutting apparatus of claim 8 in which the cameras are mounted to a structure extending above the carriage and each have views, one camera being angled downwardly forwardly and the other camera being angled downwardly rearwardly, the views of the cameras being overlapped with each other, the single combined image showing front and rear ends, and sides, of the cutting apparatus as well as some adjacent environment.

11. The cutting apparatus of claim 8 in which the cutting apparatus includes at least two cameras mounted thereto, and the images from the at least two cameras being combined together to form a single combined image.

12. The cutting apparatus of claim 1 further comprising a protective grill substantially surrounding a lateral periphery of the cutting system, the protective grill comprising a series of grill members that are spaced apart from each other for blocking lateral passage of large objects to the cutting system while allowing the passage of vegetation to be cut.

13. A method of cutting vegetation comprising:
conveying a movable carriage of a cutting apparatus over ground, the moveable carriage having a conveyance system with conveyance members; and
cutting the vegetation with a cutting system that is mounted to the carriage, the cutting system including cutting blades which drive laterally around the periphery of all of the conveyance members and cuts vegetation laterally around the conveyance members, the cutting system comprising a rotary member rotatably mounted about a rotary member rotational axis which rotates the cutting blades laterally around the conveyance members, the rotary member having two rotary arms extending away from the rotary member rotational axis, each rotary arm for rotating about the rotary member rotational axis for rotating a respective cutting blade around all of the conveyance members, each cutting blade also being drivably rotatable by a motor relative to its respective rotary arm about a respective cutting blade rotational axis.

14. The method of claim 13 further comprising forming the cutting apparatus as a lawn mower.

15. The method of claim 13 further comprising providing a set of wheels as the conveyance members.

16. The method of claim 15 further comprising driving the cutting blades laterally around the set of wheels for cutting vegetation laterally around the set of wheels.

17. The method of claim 16 further comprising providing the set of wheels with two side drive wheels, and front and rear free wheeling wheels.

18. The method of claim 17 further comprising providing swiveling caster wheels as the free wheeling wheels.

19. The method of claim 13 further comprising providing the cutting system with cutting blades that are replaceable.

20. The method of claim 15 in which the set of wheels includes drive wheels for driving the cutting apparatus, the method further comprising mounting first and second cameras to the cutting apparatus that face in two different directions, images from the first and second cameras being combined together to form a single combined image to provide remote viewing of the cutting apparatus.

21. The method of claim 20 further comprising combining the images together in an overlapping manner.

22. The method of claim 20 further comprising mounting the cameras to a post extending above the carriage and each camera viewing views, one camera being angled downwardly forwardly and the other camera being angled downwardly rearwardly, the views of the cameras being overlapped with each other, the single combined image showing front and rear ends, and sides, of the cutting apparatus as well as some adjacent environment.

23. The method of claim 20 further comprising mounting at least two cameras to the cutting apparatus and combining the images from the at least two cameras together to form the single combined image.

24. The method of claim 13 further comprising substantially surrounding a lateral periphery of the cutting system with a protective grill, the protective grill comprising a series of grill members that are spaced apart from each other for blocking lateral passage of large objects to the cutting system while allowing the passage of vegetation to be cut.

* * * * *